W. H. JACKSON.
TIME RECORDING APPARATUS.
APPLICATION FILED AUG. 25, 1908.
966,553.
Patented Aug. 9, 1910.
3 SHEETS—SHEET 1.
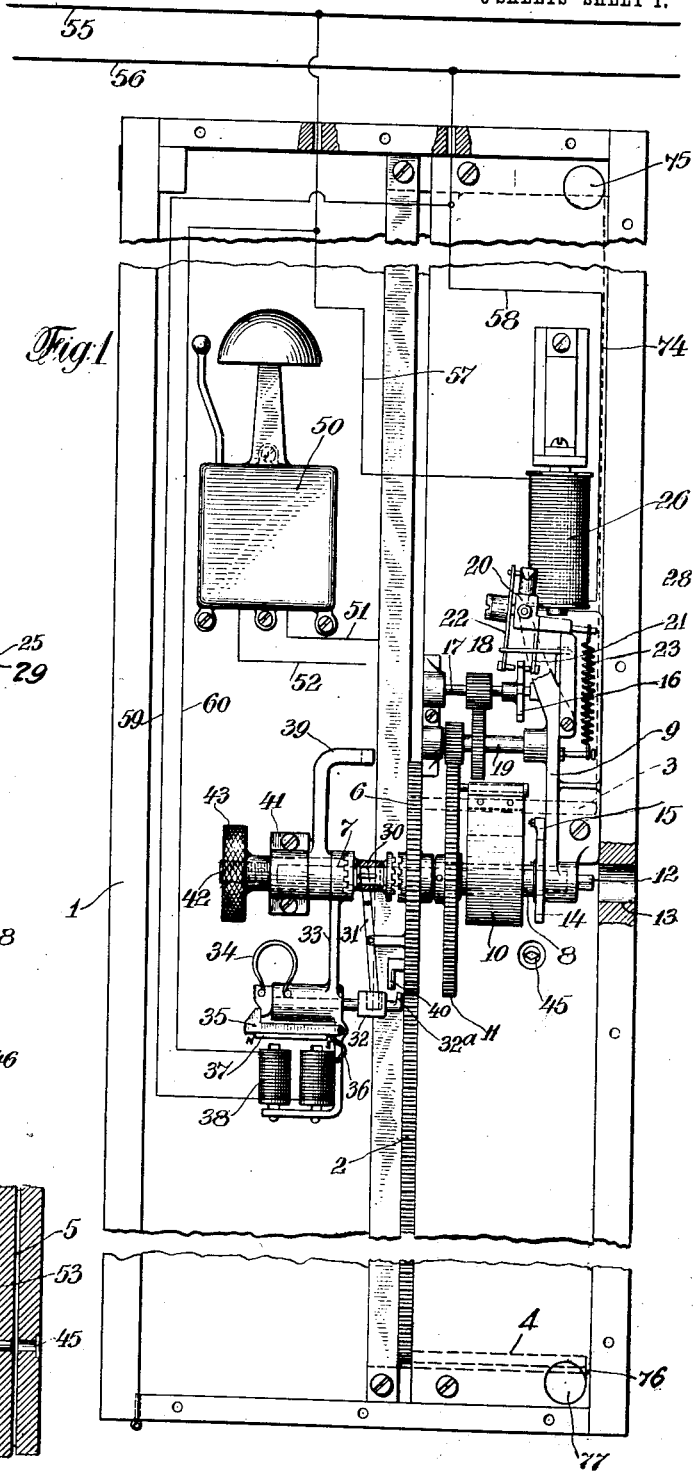
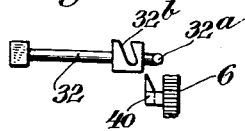
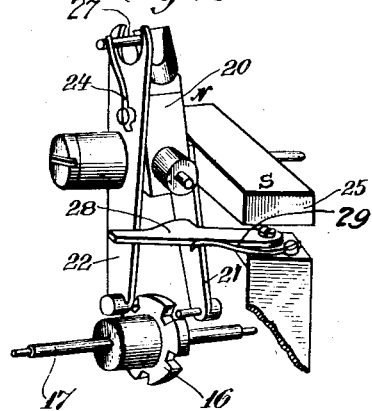
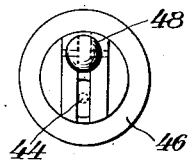
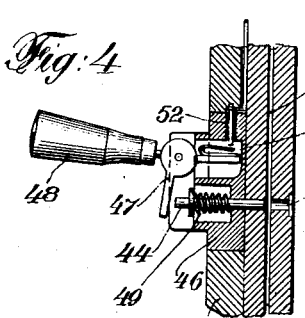
Witnesses:
Wm. J. Dolan
William Schwab
William H. Jackson Inventor
By his Attorneys Kenyon & Kenyon

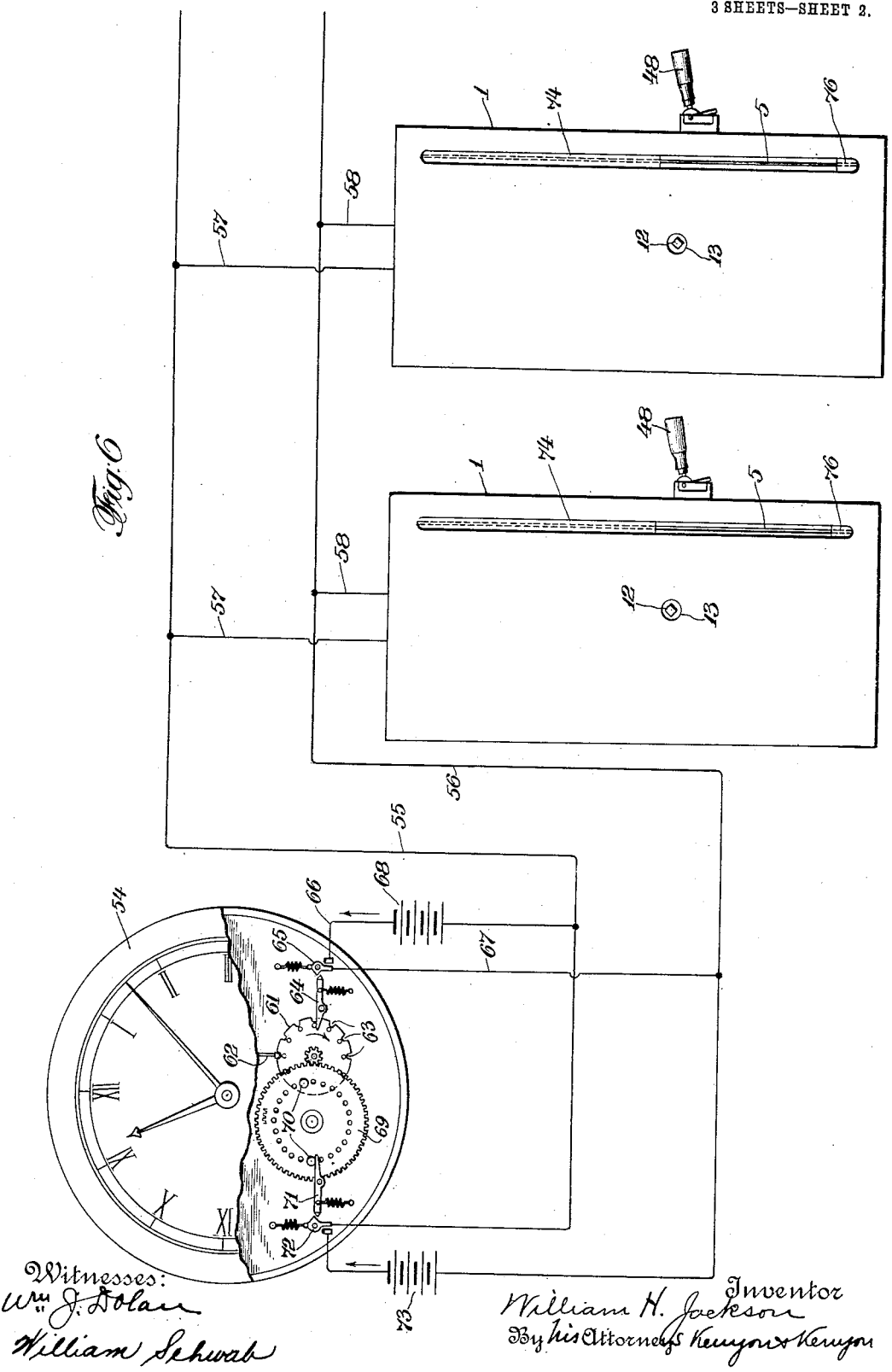

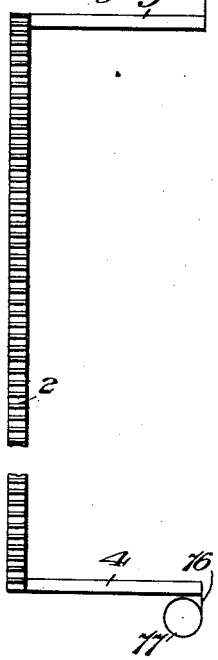

UNITED STATES PATENT OFFICE.

WILLIAM H. JACKSON, OF PALISADE, NEW JERSEY.

TIME-RECORDING APPARATUS.

966,553.   Specification of Letters Patent.   Patented Aug. 9, 1910.

Application filed August 25, 1908. Serial No. 450,143.

*To all whom it may concern:*

Be it known that I, WILLIAM H. JACKSON, a citizen of the United States, and a resident of Palisade, Bergen county, New Jersey, have invented certain new and useful Improvements in Time-Recording Apparatus, of which the following is a specification.

My invention relates to time recording apparatus; and, while it may be embodied in constructions adapted for various purposes, it is more particularly applicable to apparatus for recording the times of workmen to facilitate computing wages and the labor costs of work done.

The object of the invention is to provide a time recording apparatus capable of registering the individual records of numerous workmen, and which is at the same time simple in construction and positive in action, and proof against falsification of the records produced thereby; also to provide a machine adapted to register the times of workmen during periods of various lengths, and to record the units of time spent by each workman on each piece of work during said periods as well as the total time of each workman; also to produce a machine which will automatically adjust itself for the different working periods; also to produce a time recording apparatus in which a number of recorders are controlled from a central station, as by a single clock mechanism. These and other objects of the invention will in part be obvious and in part be more fully explained in the following description.

The invention consists in the novel parts, combinations, features of construction, and improvements herein shown and described.

The accompanying drawings, which are referred to herein and form a part hereof, illustrate one embodiment of the invention, the same serving in connection with the description herein to explain the principles of the invention.

Of the drawings: Figure 1 is a rear elevation of one embodiment of the recording mechanism forming one feature of my invention, the rear part of the casing being broken away to expose the mechanism; Fig. 2 is an enlarged perspective view of a detail of the mechanism; Fig. 3 is a plan view of another detail; Figs. 4 and 5 are, respectively, a vertical section and rear elevation of another detail; Fig. 6 is a side elevation illustrating a plurality of recording mechanisms and a clock controlled mechanism for operating the same; and Fig. 7 is a face view of a record sheet or card adapted to be used in connection with my recording mechanism. Fig. 8 is a side elevation of the card receiver detached.

A time recording apparatus constructed in accordance with certain features of my invention comprises in combination, a suitable casing, a receiver for the record sheet or card which while inclosed in the casing is freely accessible from the exterior thereof for the reception of individual time cards, a marking device for the time card, mechanism for producing a relative movement between said receiving and marking members, said mechanism being positive in action during a predetermined period of operation whereby the movable member can be neither advanced nor retarded independently of said mechanism during said period.

In accordance with another feature of my invention, means are provided for automatically releasing the said mechanism at the end of the said predetermined period to permit the movable member to be returned to a starting position for the next period.

In accordance with another feature of my invention, means are provided for automatically returning the movable member after it has been released.

Still another feature of my invention contemplates the provision of means for automatically reëngaging said mechanism after the movable member has been returned to its starting position.

In accordance with another feature of my invention, a plurality of recording mechanisms of the character specified are operated and controlled by a clock mechanism which is common to them all. In one embodiment of this feature the clock mechanism serves not only to operate the time recording mechanisms during the recording periods but also to automatically control the said periods.

These and other features of the invention will be more fully explained in connection with the particular embodiment illustrated.

Referring now in detail to the embodiment of the invention illustrated in the drawings, each of the recording mechanisms, herein referred to as the recorder, comprises a casing 1 which incloses the mechanism and is normally closed and locked in any desired manner, not shown. As shown, the mechanism contained within the casing includes a card receiver, consisting of a bar 2 having a pair of arms 3 and 4 fixed at the opposite ends thereof and arranged in a slot 5 in the casing, said slot being accessible from the exterior, as shown in Fig. 6. While either this card receiving member or the card marking member, hereinafter described, may be moved with relation to the other, in the embodiment illustrated the marking member is stationary and the card receiving member is intermittently moved with relation thereto, the movements being effected at predetermined intervals and being of a predetermined length to correspond to the minimum units of time which it is desired to record.

In the construction shown the mechanism for intermittently moving the card receiver is as follows: The bar 2 of the card receiving member is provided with rack teeth and normally meshes with a gear 6, which is loosely journaled on a shaft 7. This shaft 7 is loosely journaled at one end in a sleeve 8 rotatably mounted in a bearing formed in the frame member 9. Fixed to the inner end of the sleeve 8 is a spring 10, the other end of which is fixed to a gear 11 fixed on the shaft 7. The outer end 12 of the sleeve 8 is adapted to receive a key, which may be inserted through the opening 13 in the casing, as required to wind up the spring, the sleeve being provided with a ratchet 14 which is engaged by a detent 15 to retain the spring in its wound up condition.

The movement of the gear 11 under the influence of the spring is controlled by an escapement mechanism constructed as follows: An escapement wheel 16 is fixed on a shaft 17, which is geared with the wheel 11 through a pinion 18 and intermediate gears on a shaft 19. An escapement rocker 20 is pivotally mounted above the escape wheel 16, and is provided with a fixed pawl-arm 21 and a pivoted pawl-arm 22. The rocker 20 is normally held with the fixed pawl in one of the teeth of the escapement wheel by a spring 23. The loose pawl is normally held in its retracted position opposite the succeeding tooth of the escapement wheel by any suitable means, such as the spring 24. The rocker 20 may be operated in various ways to permit the escapement wheel to advance one tooth or step at a time under the influence of the spring 10. As shown, the rocker 20 carries the armature 25 of an electromagnet 26, which is normally energized by a clock controlled electric circuit, as will be presently explained. It will be seen that when the armature 25 is lifted by the magnet against the force of the spring 23, the fixed dog 21 will be moved out of the tooth of the escapement wheel 16, and the pivoted dog 22 will be simultaneously moved into engagement with the succeeding tooth of the escapement wheel. The escapement wheel will then advance under the influence of the spring 10 until the forward movement of the pivoted dog is limited by a stop pin 27 suitably mounted on the rocker 20. When the rocker 20 has been moved by the magnet to transfer the control of the escapement wheel 16 from the fixed dog 21 to the loose dog 22, the rocker is retained in this position by a latch 28 which is pivoted on the frame and normally pressed in a direction to engage the fixed dog or arm 21 by a spring 29. When the pivoted dog arm 22 has been advanced by the spring 10 through the action of the escapement wheel 16, said arm 22 will engage the latch 28 and release the arm 21, thus allowing the rocker to assume its normal position under the influence of the spring 23. It will be seen that this escapement mechanism is positive in action. That is to say, the mechanism connected therewith is normally locked by the rigid dog so that it cannot be moved in either direction and can only advance one step at a time, when the recorder is actuated, and the rocker cannot return to its normal position until the mechanism has advanced the distance permitted by the free movement of the pivoted dog arm 22.

In order that the movements of the wheel 11 under the control of the escapement may be transmitted to the card receiver, as desired, a clutch member 30 is splined on the shaft 7 so that it may be moved into and out of engagement with a corresponding clutch member formed on the gear 6. So far as certain features of the invention are concerned, the clutch member 30 may be operated in any suitable way to connect the gear 6 with the shaft 7 so as to start the movements of the card receiver and thus begin a recording period, and likewise the clutch may be operated in any suitable way to stop the movement of the card receiver and thus end the recording period. In accordance with one feature of the invention, moreover, the clutch is operated automatically both to connect the escapement control mechanism with the card receiver and to disconnect or release said mechanism at the end of a predetermined recording period. While this automatic mechanism for controlling the clutch may be constructed in various ways, as shown, the clutch 30 is controlled by a lever 31 fulcrumed on the gear 6 and adapted to be engaged and moved by certain devices normally fixed on the frame.

When the card receiving member is in the starting position, the outer end of the lever 31 is engaged by a slide 32 mounted in arm 33 normally fixed on the frame. The slide 32 is normally pressed in a direction to throw the clutch 30 into mesh with the clutch member on the wheel 6 by a spring 34 but is normally restrained from movement under the influence of the spring by a catch 35 pivotally mounted on the arm 33 and held in position to engage the slide 32 by a spring 36. This latch 35 may be actuated to release the slide 32 in various ways. In the embodiment illustrated the catch 35 carries the armature 37 of an electromagnet 38, which is energized so as to release the arm 32, when it is desired to start a recording period. One means for energizing this magnet will be presently explained. It follows from this construction that when the magnet 38 is energized so as to release the slide 32, the spring 34 will operate the clutch 30 to connect the wheel 6 with the shaft 7. The magnet 26 being energized intermittently, the card receiver will be advanced step by step until the clutch 30 is actuated to release the escapement control mechanism from the card receiver. In the construction shown this releasing operation is effected by means of an arm 39, having at its end a cam arranged to engage the outer end of the lever 31 and move it so as to disengage the clutch 30 from the wheel 6. Any suitable mechanism may be provided to return the card receiver, when the driving mechanism is thus released. In the construction shown the weight of the card receiver is utilized for this purpose. When the card receiver returns to the position from which it started, the lever 31 will again engage the slide 32, which in the meantime has been returned to its normal position by a cam 40 on the wheel 6, which during the upward movement of the card receiver engages a suitable projection 32$^a$ on the slide 32. Preferably and as shown, the slide 32 is provided with a slot 32$^b$ (see Fig. 3), which engages the end of the lever and acts as a cam to move it so as to cause the clutch 30 to engage a corresponding and normally fixed clutch member on the hub of the arm 33, the card receiver being thereby locked in its starting position until the magnet 38 is again properly energized. It will be seen that by reason of this construction the clutch 30 cannot be reëngaged with the wheel 6 so as to start the card receiver until the latter is returned to its starting position.

In order that the starting and stopping positions of the card receiving member may be varied so as to control the beginning and end and the duration of the recording period, both the arms 33 and 39 are adjustably mounted on the frame so that the clutch lever controlling members thereon can be moved circumferentially or in the path of the free end of the clutch controlling lever 31. To this end the arm 33 is provided with a sleeve, rotatably mounted in the fixed bearing 41 and provided with a threaded stem 42, having a thumb nut 43, the hub of the arm 39 being loosely journaled on the sleeve of the arm 33 and between the hub of that arm and the bearing 41. It follows from this construction that when the nut 43 is loosened, both the arms 33 and 39 may be set in desired positions and then secured in such positions by again tightening the nut 43. It will be observed that the shaft 7 is loosely journaled in the sleeve of the arm 33.

Any suitable means may be provided for registering the recording marks on the cards carried by the receiver. Preferably and as shown, however, a perforating device is used for this purpose. The details of this device in the embodiment herein illustrated are shown in Figs. 4 and 5. As here shown, a punch 44 is arranged on one side of the slot 5, in which the card receiver moves, and a die 45 on the other side of said slot. The punch may be operated in various ways. As shown, it is mounted in a block 46 set in the front wall of the casing 1, which block also carries a punch operating lever 47, having a handle 48. The punch is normally retained in retracted position by a spring 49. It will be seen that by depressing the handle 48, the punch will be driven into the die through the card so as to form a perforation in the latter. Preferably, suitable means are provided whereby each operation of the punch is caused to sound a bell. As shown, a suitable electric bell 50 is arranged within the casing 1, one branch 51 of the circuit being connected with the frame, and the other 52 being insulated from the frame and arranged to be engaged by a contact piece 53 carried by the operating lever 48, as shown in Fig. 4.

So far as certain features of my invention are concerned, the magnets 26 and 38 may be energized in any suitable way, the latter magnet being energized either automatically or by a hand controlled switch. In accordance with one feature of my invention, however, both these magnets are automatically energized by clock controlled switches. In accordance with one embodiment of this feature of the invention, moreover, a single clock controlled mechanism is arranged to control both magnets, and preferably, also, to control the magnets of a plurality of recorders by a single system of wiring, involving the provision of a single electric circuit extending between the clock and the series of recorders. Such an arrangement is illustrated in Fig. 6. As here shown, the clock 54, which may be arranged in any desired part of the building, is connected by the wires 55 and 56 with any desired number of the recorders, two being illustrated.

As represented in Fig. 1, wires 55 and 56 are respectively connected by the wires 57 and 58 with the magnet 26, and the wires 57 and 58 are respectively connected by the wires 59 and 60 with the magnet 38, so that any electric circuit which is established through the wires 55 and 56 will pass through both magnets. The two magnets 26 and 38 are, however, so constructed that one will only respond to one character of electric current, and the other will correspond only to an electric current of another character, This may be accomplished in various ways. As represented in the drawing, the armature 25 of the magnet 26 is in the form of a permanent magnet, so that when the current flows in one direction through the magnet, the armature will be attracted; and when it flows in the other direction, the armature will be repelled. In the same way, the armature 37 of the magnet 38 is a permanent magnet but this armature is so arranged that it will not be attracted when the current flows in such a direction as to attract the armature 25 but will be attracted when the current flows in the opposite direction. It will be seen therefore that in order properly to operate and control the several recorders, it is only necessary to momentarily energize the wires 55 and 56 by a current flowing in the proper direction to render the magnets 26 operative at the required predetermined intervals corresponding to the minimum units of time which it is desired to record and to momentarily energize the wires 55 and 56 by a current flowing in the opposite direction at the times when it is desired to start the recording operations. For example, if it is desired to start the recording operation at 7 o'clock in the morning and to record ten minute intervals of time, the clock controlled mechanism will be arranged to momentarily energize the wires 55 and 56 once every ten minutes by a current flowing in one direction, and to energize the said wires by a current flowing in the opposite direction at 7 o'clock in the morning. If it is desired to have more than one recording period during each day, the wires 55 and 56 will be energized with the reverse current at the beginning of each desired period, in any case the several recorders being adjusted so as to automatically stop the recording periods at the desired times. For example, the recording operations may be started at 7 o'clock in the morning, automatically stopped at 12 noon, automatically started again at 1 o'clock, automatically stopped at 6 o'clock, and automatically started again immediately thereafter, and then automatically stopped before 7 o'clock in the morning or at any desired time between 6 o'clock at night and 7 of the following morning. In the embodiment illustrated the clock controlled mechanism for thus momentarily energizing the circuit wires 55 and 56 is constructed as follows: A wheel 61 is connected, as by a shaft 62, with the clock so as to make one revolution each two hours. This wheel is provided with twelve pins 63, each of which is adapted to engage one end of a spring controlled lever 64. The opposite end of the lever 64 is arranged to actuate a spring controlled switch 65 adapted to make and break a circuit including the wires 66 and 67, respectively connected with the wires 55 and 56 and including a battery 68 tending to send the current in the direction of the arrow. As shown, the switch 65 is so arranged that when the lever 64 is moved by each of the pins 63, the circuit will not be closed; but when the lever is released by the pins, it will be moved by its spring so as to momentarily close the circuit. It will be seen therefore that the effect of the wheels 64 is to energize the wires 56 by the current from the battery 68 once every ten minutes.

Geared to the wheel 63 so as to make a revolution once every twenty-four hours is a wheel 69, which is provided with any desired number of perforations in which may be placed in any desired relation to each other one or more pins 70. These pins operate on a spring pressed lever 71 in the same manner that the pins 63 operate on the lever 64, and the lever 71 operates a spring controlled switch 72 to momentarily close a circuit through the wires 55 and 56, which include a battery 73 adapted to energize said wires with a current flowing in the direction opposite to that of the battery 68. It will be seen that by suitably adjusting the pins 70 in the wheel 69, the electric circuit may be energized so as to start the recorders at any desired predetermined time or times.

It will be obvious that, so far as some features of my invention are concerned and if desired, the magnets 26 and 38 may be connected by entirely independent circuits with the two switches 65 and 72, said separate circuits being energized by suitable batteries or other sources of electric energy.

While various forms of record sheet or time card may be employed in connection with the construction shown, a preferred form of card adapted to be used in connection with my recorders is illustrated in Fig. 7. As here shown, the card is provided at the top with suitable data, including the name of the workman, the department in which he is employed, the date, the number of the card or workman, and the rate at which he is paid. Below these are several vertical columns, one for the numbers of the various jobs in which he is employed, another for the character of the work done, another for the total amount of work devoted to each job, and finally a column in which the time records are formed. The latter column is divided first by horizontal lines into spaces representing the hours of a working period, and these spaces are subdivided by horizontal lines into the minimum periods of time to be recorded, e. g., ten minute intervals, which are preferably designated both by the minutes of the hour and also by the successive numbers of the units in the entire working period. The lines designating the units of time are graduated to correspond with the successive movements of the card receiver so that when a card is placed in the receiver and the marking member or punch operated, the mark or perforation on the card will correspond to the time when the record was made, and the spaces between two successive marks on the card will indicate the time or number of units of work devoted to any particular job. In like manner the space between the first and the last marks on the card, as indicated by the numbers of the units, will represent the total time worked by the workman during the working period represented by the card. If there is an intermission or recess during the working period represented by the card, the units of working time corresponding thereto will be left blank in the column of unit members. For example, if the period represented by the card is the entire day from 7 in the morning until 6 at night and there is a recess of a half hour from 12.30 to 1, the spaces representing the units between 12.30 and 1 will be left blank in the column representing the units of work, the calculation of the time spent on the job in hand during the noon recess and the total time of the workman for the day being thereby facilitated.

In order to make a record on my recorder, all that is necessary to do is for the workman to insert the card in the card receiver through the slot 5 and press the handle 48. If it should happen that the magnet 26 be energized while a record is being made, so that the card receiver is not free to move when the escapement rocker is moved and released by the magnet, the said rocker will be retained in its abnormal position by the latch 28 until the card is removed and the receiver thereby liberated. Thereupon the card receiver will move under the influence of the spring 10 so that the pivoted dog 22 will advance and release the catch 28 and thus allow the escapement rocker to return to its normal position. If it were not for the presence of the catch 28, it will be seen that if the card receiver were prevented from moving, when the magnet 26 is energized, the rocker would return to its normal position and the rigid dog 21 would return into the same tooth of the escapement wheel from which it had been withdrawn so that the card receiver would not be properly advanced. With the construction shown it will be necessary in order to prevent the advance of the receiver for each operation of the magnet 26 to hold the card receiver against the action of the spring 28 during the entire period between the two successive operations of the magnet.

It obviously would be impossible for a workman to do this without attracting attention unless he could in some way insert something into the slot 5 which would prevent the movement of the card receiver. This could not be done without danger of detection but in order to prevent so far as possible the operation of the machine being thus interfered with, I preferably provide means for closing the slot 5 above and below the card receiver, this means also making it impossible to insert a card in the slot except at the right point to properly enter it in the card receiver. As shown, this means consists of a flexible strip 74 secured at one end to the upper arm 3 of the receiver and at the other end to a spring drum 75 mounted in the casing 1 adjacent to the upper end of the slot 5. A similar strip 76 may be secured to the lower arm 4 of the card receiver and wound on a similar drum 77 mounted in the casing at the lower end of the slot.

It will be understood that the springs 10 of the several recorders will be rewound at suitable intervals by the person in charge of the recording apparatus, this being done by a suitable key adapted to be inserted through the opening 13 in the casing so as to engage the suitably formed end 12 of the sleeve 8 to which one end of the spring 10 is secured.

I may say in general that my invention in its broader aspects is not limited to the particular constructions and arrangements shown nor to any particular construction by which it has been or may be carried into effect, as many changes may be made in the details of the construction without departing from the main principles of the invention and without sacrificing its chief advantages.

I claim:

1. A time recorder including in combination, a casing, a card receiving member freely accessible from the exterior of said casing for the reception of individual time cards, a card marking member, one of said members being bodily movable relatively to the other, and clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said period.

2. A time recorder including in combination a casing, a card receiving member freely accessible from the exterior of said casing for the reception of individual time cards, a card marking member, one of said members being bodily movable relatively to the other, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said period, and means for automatically releasing said mechanism at the end of said predetermined period to permit the movable member to be returned to a starting position.

3. A time recorder including in combination, a casing, a card receiving member freely accessible from the exterior of said casing for the reception of individual time cards, and a card marking member, one of said members being bodily movable relatively to the other, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said period, means for automatically releasing said mechanism at the end of said predetermined period, and means for automatically reëngaging said mechanism when and only when said movable member has been returned to a predetermined starting position.

4. A time recorder including in combination, a casing, a card receiving member freely accessible from the exterior of said casing for the reception of individual time cards, a card marking member, one of said members being bodily movable relatively to the other, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said period, means for automatically releasing said mechanism at the end of said predetermined period, and means for automatically returning said movable member to a starting position.

5. A time recorder including in combination, a casing, a card receiving member freely accessible from the exterior of said casing for the reception of individual time cards, a card marking member, one of said members being bodily movable relatively to the other, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said period, means for automatically releasing said mechanism at the end of said predetermined period, means for automatically returning said movable member to a starting position, and means for automatically reëngaging said mechanism when said movable member has been returned.

6. A time recorder including in combination, a casing, a card receiving member freely accessible from the exterior of said casing for the reception of individual time cards, a card marking member, one of said members being movable relatively to the other, clock controlled mechanism for moving said movable member through predetermined distances at predetermined intervals, said mechanism including a motive power and a positively interlocked escapement whereby said movable member can be neither advanced nor retarded independently of said mechanism while connected with said escapement, and means for automatically releasing said escapement after a predetermined period of operation to permit the movable member to be returned to a starting position.

7. A time recorder including in combination, a casing, a card receiving member freely accessible from the exterior of said casing for the reception of individual time cards, a card marking member, one of said members being movable relatively to the other, clock controlled mechanism for moving said movable member through predetermined distances at predetermined intervals, said mechanism including a motive power and a positively interlocked escapement whereby said movable member can be neither advanced nor retarded independently of said mechanism while connected with said escapement, means for automatically releasing said escapement after a predetermined period of operation, and means for automatically reëngaging said escapement when and only when said movable member has been returned to a predetermined starting position.

8. A time recorder including in combination, a casing, a card receiving member freely accessible from the exterior of said casing for the reception of individual time cards, a card marking member, one of said members being movable relatively to the other, clock controlled mechanism for moving said movable member through predetermined distances at predetermined intervals, said mechanism including a motive power and a positively interlocked escapement whereby said movable member can be neither advanced nor retarded independently of said mechanism while connected with said escapement, means for automatically releasing said escapement after a predetermined period of operation, and means for automatically returning said movable member to a starting position.

9. A time recorder including in combination, a casing, a card receiving member freely accessible from the exterior of said casing for the reception of individual time cards, a card marking member, one of said members being movable relatively to the other, clock controlled mechanism for moving said movable member through predetermined distances at predetermined intervals, said mechanism including a motive power and a positively interlocked escapement whereby said movable member can be neither advanced nor retarded independently of said mechanism while connected with said escapement, means for automatically releasing said escapement after a predetermined period of operation, means for automatically returning said movable member to a starting position, and means for automatically reëngaging said escapement when said movable member has been returned.

10. A time recorder including in combination, a casing, a card receiving member freely accessible from the exterior of said casing for the reception of individual time cards, a card marking member, one of said members being bodily movable relatively to the other, mechanism including a positively interlocked escapement for intermittently moving said movable member through predetermined distances and holding the same immovable during the intervals, a magnet for actuating said escapement, and a clock controlled electric circuit for energizing said magnet at predetermined intervals.

11. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet for actuating said escapement, a clock controlled electric circuit for energizing said magnet at predetermined intervals, and means for automatically releasing said escapement after a predetermined period of operation to permit the movable member to be returned to a starting position.

12. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet for actuating said escapement, a clock controlled electric circuit for energizing said magnet at predetermined intervals, means for automatically releasing said escapement after a predetermined period of operation, and means for automatically reëngaging said escapement when and only when said movable member has been returned to a predetermined starting position.

13. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet for actuating said escapement, a clock controlled electric circuit for energizing said magnet at predetermined intervals, means for automatically releasing said escapement after a predetermined period of operation, and means for automatically returning said movable member to a starting position.

14. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet for actuating said escapement, a clock controlled electric circuit for energizing said magnet at predetermined intervals, means for automatically releasing said escapement after a predetermined period of operation, means for automatically returning said movable member to a starting position, and means for automatically reëngaging said escapement when said movable member has been returned.

15. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet for actuating said escapement, a clock controlled electric circuit for energizing said magnet at predetermined intervals, means for automatically releasing said escapement after a predetermined period of operation, and means including a magnet and a clock controlled electric circuit for energizing said magnet for reëngaging said escapement at predetermined times.

16. A time recorder including in combination, a casing, a card receiving member freely accessible from the exterior of said casing for the reception of individual time cards, a card marking member, one of said members being movable relatively to the other, mechanism including a positively interlocked escapement for intermittently moving said movable member through predetermined distances, a magnet responsive to one character of electric current for actuating said escapement, means for releasing said escapement after a predetermined period of operation, means including a magnet responsive to another character of electric current for reëngaging said escapement, an electric circuit including both said magnets, and clock controlled means for energizing said circuits with the said different characters of currents at predetermined intervals.

17. A time recording apparatus including in combination, a plurality of time recorders each comprising a freely accessible card receiving member, a card marking member, one of said members being bodily movable relatively to the other, a positively interlocked mechanism for intermittently moving said member through predetermined distances and holding the same immovable during the intervals, and a magnet for actuating said mechanism, a clock, and electric connections for energizing said magnets at predetermined intervals.

18. A time recording apparatus including in combination, a plurality of time recorders each comprising a freely accessible card receiving member, a card marking member, one of said members being movable relatively to the other, a positively interlocked mechanism for intermittently moving said member through predetermined distances, and a magnet for actuating said mechanism, means for releasing said mechanism after a predetermined period of operation, means including a magnet for reëngaging said mechanism, a clock, and electric connections for energizing the magnets of each of said recording devices at predetermined intervals.

19. A time recording apparatus including in combination, a plurality of time recorders each comprising a freely accessible card receiving member, a card marking member, one of said members being movable relatively to the other, a positively interlocked mechanism for intermittently moving said member through predetermined distances, a magnet responsive to one character of current for actuating said mechanism, means for releasing said mechanism after a predetermined period of operation, means including a magnet responsive to another character of current for reëngaging said mechanism, an electric circuit including both magnets of each recorder, and clock controlled means for energizing said circuit with different characters of currents at predetermined intervals.

20. A time recorder including in combination, a card receiving member, a card marking member, one of said members being bodily movable relatively to the other, clock controlled positively interlocked mechanism for moving said movable member through predetermined distances at predetermined intervals and holding the same immovable between said intervals, means for automatically releasing said mechanism, and means for automatically reëngaging said mechanism, and means whereby the interval between said releasing and reëngaging operations may be varied.

21. A time recorder including in combination, a card receiving member, a card marking member, one of said members being bodily movable relatively to the other, clock controlled positively interlocked mechanism for moving said movable member through predetermined distances at predetermined intervals and holding the same immovable between said intervals, means for automatically releasing said mechanism and means for automatically reëngaging said mechanism, and means whereby the times when said mechanism is released and reëngaged may be varied.

22. A time recorder including in combination, a casing, a movable card receiver freely accessible from the exterior of said casing, a slot in said casing through which said receiver is rendered accessible, and means for closing said slot in advance of said receiver.

23. A time recorder including in combination, a casing, a movable card receiver freely accessible from the exterior of said casing, a slot in said casing through which said receiver is rendered accessible, and means for closing said slot on each side of said receiver.

24. A time recorder including in combination, a casing, a card receiving member freely accessible from the exterior of said casing for the reception of individual time cards, a card marking member, said card receiving member being movable relatively to said card marking member, and clock controlled mechanism for moving said movable member through predetermined distances at predetermined intervals, said mechanism being positively interlocked during a predetermined period of operation whereby said movable member can be neither advanced nor retarded independently of said mechanism during said period.

25. A time recorder including in combination, a casing, a card receiving member freely accessible from the exterior of said casing for the reception of individual time cards, a card marking member, said card receiving member being movable relatively to said card marking member, clock controlled mechanism for moving said card receiving member through predetermined distances at predetermined intervals, said mechanism being positively interlocked during a predetermined period of operation whereby said card receiving member can be neither advanced nor retarded independently of said mechanism during said period, means for automatically releasing said mechanism at the end of said predetermined period, and means for automatically returning said card receiving member to a starting position.

26. A time recorder including in combination, a casing, a card receiving member freely accessible from the exterior of said casing for the reception of individual time cards, a card marking member, said card receiving member being movable relatively to said card marking member, mechanism including a positively interlocked escapement for intermittently moving said card receiving member through predetermined distances, a magnet for actuating said escapement, and a clock controlled electric circuit for energizing said magnet at predetermined intervals.

27. A time recorder including in combination, a casing, a card receiving member freely accessible from the exterior of said casing for the reception of individual time cards, a card marking member, said card receiving member being movable relatively to said card marking member, clock controlled mechanism for moving said card receiving member through predetermined distances at predetermined intervals, said mechanism being positively interlocked during a predetermined period of operation whereby said card receiving member can be neither advanced nor retarded independently of said mechanism during said period, means for automatically releasing the said mechanism at the end of said predetermined period, and means for automatically reëngaging said mechanism when and only when said card receiving member has been returned to a predetermined starting position.

28. A time recorder including in combination, a casing a card receiving member freely accessible from the exterior of said casing for the reception of individual time cards, a card marking member, said card receiving member being movable relatively to said card marking member, clock controlled mechanism for moving said card receiving member through predetermined distances at predetermined intervals, said mechanism including a motive power and a positively interlocked escapement whereby said card receiving member can be neither advanced nor retarded independently of said mechanism while connected with said escapement, means for automatically releasing said escapement after a predetermined period of operation, and means for automatically reëngaging said escapement when and only when said card receiving member has been returned to a predetermined starting position.

29. A time recorder including in combination, a casing, a card receiving member, a card marking member, said card receiving member being movable relatively to said card marking member and freely accessible from the exterior of said casing in a direction transverse to the direction of movement of the said card receiving member to receive individual time cards and hold them immovable in the direction of movement of the card receiving member, clock controlled mechanism for moving said card receiving member through predetermined distances at predetermined intervals, said mechanism being positively interlocked during a predetermined period of operation whereby said card receiving member can be neither advanced nor retarded independently of said mechanism during said period.

30. A time recorder including in combination, a casing, a card receiving member, a card marking member, said card receiving member being movable relatively to said card marking member and freely accessible from the exterior of said casing in a direction transverse to the direction of movement of the said card receiving member to receive individual time cards and hold them immovable in the direction of movement of the card receiving member, clock controlled mechanism for moving said card receiving member through predetermined distances at predetermined intervals, said mechanism being positively interlocked during a predetermined period of operation whereby said card receiving member can be neither advanced nor retarded independently of said mechanism during said period, means for automatically releasing said mechanism at the end of said predetermined period and means for automatically reëngaging said mechanism when and only when said card receiving member has been returned to a predetermined starting position.

31. A time recorder including in combination, a casing, a card receiving member, a card marking member, said card receiving member being movable relatively to said card marking member and freely accessible from the exterior of said casing in a direction transverse to the direction of movement of the said card receiving member to receive individual time cards and hold them immovable in the direction of movement of the card receiving member, clock controlled mechanism for moving said card receiving member through predetermined distances at predetermined intervals, said mechanism including a motive power and a positively interlocked escapement whereby said card receiving member can be neither advanced nor retarded independently of said mechanism while connected with said escapement, means for automatically releasing said escapement after a predetermined period of operation to permit the card receiving member to be returned to a starting position, and means for automatically reëngaging said escapement when and only when said card receiving member has been returned to a predetermined starting position.

32. A time recorder including in combination, a casing, a card receiving member, a card marking member, one of said members being bodily movable relatively to the other, said card receiving member being accessible from the exterior of said casing in a direction transverse to the direction of movement between said members to receive individual time cards and hold them immovable in the direction of said relative movement, clock controlled mechanism for moving said movable member through predetermined distances at predetermined intervals and holding the same immovable between said intervals, and a card having divisions corresponding to the distances through which the movable member is moved, said card being fitted to the receiver so that it cannot move with relation thereto in the direction of said relative movement.

33. A time recorder including in combination, a casing, a card receiving member, a card marking member, one of said members being bodily movable relatively to the other, said card receiving member being accessible from the exterior of said casing in a direction transverse to the direction of movement between said members to receive individual time cards and hold them immovable in the direction of said relative movement, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said operation, and a card having divisions corresponding to the distances through which the movable member is moved, said card being fitted to the receiver so that it cannot move with relation thereto in the direction of said relative movement.

34. A time recorder including in combination, a casing, a card receiving member, a card marking member, one of said members being bodily movable relatively to the other, said card receiving member being accessible from the exterior of said casing in a direction transverse to the direction of movement between said members to receive individual time cards and hold them immovable in the direction of said relative movement, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said operation, means for automatically releasing said mechanism at the end of said predetermined period, and a card having divisions corresponding to the distances through which the movable member is moved, said card being fitted to the receiver so that it cannot move with relation thereto in the direction of said relative movement.

35. A time recorder including in combination, a casing, a card receiving member, a card marking member, one of said members being bodily movable relatively to the other, said card receiving member being accessible from the exterior of said casing in a direction transverse to the direction of movement between said members to receive individual time cards and hold them immovable in the direction of said relative movement, clock controlled mechanism for moving said movable member through predetermined distances at predetermined intervals, said mechanism being positively interlocked during a predetermined period of said clock-controlled operation whereby said movable member can be neither advanced nor retarded independently of said mechanism during said operation, means for automatically releasing said mechanism at the end of said predetermined period, means for automatically reëngaging said mechanism when and only when said movable member has been returned to a predetermined starting position, and a card having divisions corresponding to the distances through which the movable member is moved, said card being fitted to the receiver so that it cannot move with relation thereto in the direction of said relative movement.

36. A time recorder including in combination, a casing, a card receiving member, a card marking member, one of said members being bodily movable relatively to the other, said card receiving member being accessible from the exterior of said casing in a direction transverse to the direction of movement between said members to receive individual time cards and hold them immovable in the direction of said relative movement, clock controlled mechanism for moving said movable member through predetermined distances at predetermined intervals, said mechanism including a motive power and a positively interlocked escapement whereby said movable member can be neither advanced nor retarded independently of said mechanism while connected with said escapement, means for automatically releasing said escapement after a predetermined period of said clock-controlled operation, means for automatically reëngaging said escapement when and only when said movable member has been returned to a predetermined starting position, and a card having divisions corresponding to the distances through which the movable member is moved, said card being fitted to the receiver so that it cannot move with relation thereto in the direction of said relative movement.

37. A time recorder including in combination, a casing, a card receiving member, a card marking member, said card receiving member being bodily movable relatively to said card marking member and freely accessible from the exterior of the casing in a direction transverse to the direction of movement of said card receiving member, clock controlled mechanism for moving said card receiving member through predetermined distances at predetermined intervals and holding the same immovable between said intervals, and a card having divisions corresponding to the distances through which the card receiving member is moved, said card being fitted to the receiver so that it cannot move with relation thereto in the direction that the receiver moves.

38. A time recorder including in combination, a casing, a card receiving member, a card marking member, said card receiving member being bodily movable relatively to said card marking member and freely accessible from the exterior of the casing in a direction transverse to the direction of movement of said card receiving member, clock controlled mechanism for moving said card receiving member through predetermined distances at predetermined intervals, said mechanism being positively interlocked during a predetermined period of said clock-controlled operation whereby said card receiving member can be neither advanced nor retarded independently of said mechanism during said period, and a card having divisions corresponding to the distances through which the card receiving member is moved, said card being fitted to the receiver so that it cannot move with relation thereto in the direction that the receiver moves.

39. A time recorder including in combination, a casing, a card receiving member, a card marking member, said card receiving member being bodily movable relatively to said card marking member and freely accessible from the exterior of the casing in a direction transverse to the direction of movement of said card receiving member, clock controlled mechanism for moving said card receiving member through predetermined distances at predetermined intervals, and holding the same immovable between said intervals, means for automatically releasing said mechanism at the end of a predetermined period, means for automatically reëngaging said mechanism when and only when said card receiver has been returned to a predetermined starting position, and a card having divisions corresponding to the distance through which the card receiving member is moved, said card being fitted to the receiver so that it cannot move with relation thereto in the direction that the receiver moves.

40. A time recorder including in combination, a casing, a card receiving member, a card marking member, said card receiving member being bodily movable relatively to said card marking member and freely accessible from the exterior of the casing in a direction transverse to the direction of movement of said card receiving member, clock controlled mechanism for moving said card receiving member through predetermined distances at predetermined intervals, said mechanism being positively interlocked during a predetermined period of said clock-controlled operation whereby said card receiving member can be neither advanced nor retarded independently of said mechanism during said period, means for automatically releasing said mechanism at the end of said predetermined period, means for automatically reëngaging said mechanism when and only when said card receiving member has been returned to a predetermined starting position, and a card having divisions corresponding to the distances through which the card receiving member is moved, said card being fitted to the receiver so that it cannot move with relation thereto in the direction that the receiver moves.

41. A time recorder including in combination, a casing, a card receiving member, a card marking member, said card receiving member being bodily movable relatively to said card marking member and freely accessible from the exterior of the casing in a direction transverse to the direction of movement of said card receiving member, clock controlled mechanism for moving said card receiving member through predetermined distances at predetermined intervals, said mechanism including a motive power and a positively interlocked escapement whereby said card receiving member can be neither advanced nor retarded independently of said mechanism nor connected with said escapement, means for automatically releasing said escapement after a predetermined period of said clock-controlled operation to permit the card receiving member to be returned to a starting position, means for automatically reëngaging said escapement when and only when said card receiving member has been returned to a predetermined starting position, and a card having divisions corresponding to the distances through which the card receiving member is moved, said card being fitted to the receiver so that it cannot move with relation thereto in the direction that the receiver moves.

42. A card receiver, a card-marking device, one movable relatively to the other, and clock-controlled mechanism for periodically moving said movable member and for holding the same immovable between such operations.

In testimony whereof, I have signed my name to this specification, in the presence of two subscribing witnesses.

WILLIAM H. JACKSON.

Witnesses:
   A. BAUMANN,
   CHAS. S. BURGESS.